(12) United States Patent
Barkhordarian et al.

(10) Patent No.: US 8,815,207 B2
(45) Date of Patent: Aug. 26, 2014

(54) METHOD OF ACTIVATING OR REGENERATING A HYDROGEN STORAGE MATERIAL

(75) Inventors: Gagik Barkhordarian, Geesthacht (DE); Claudio Pistidda, Geesthacht (DE); Martin Dornheim, Reppenstedt (DE); Rüdiger Bormann, Rosengarten (DE)

(73) Assignee: GKSS-Forschungszentrum Geesthacht GmbH, Geesthacht (DE)

( * ) Notice: Subject to any disclaimer, the term of this patent is extended or adjusted under 35 U.S.C. 154(b) by 839 days.

(21) Appl. No.: 12/635,315

(22) Filed: Dec. 10, 2009

(65) Prior Publication Data

US 2010/0160149 A1 Jun. 24, 2010

(30) Foreign Application Priority Data

Dec. 19, 2008 (DE) .......................... 10 2008 063 895

(51) Int. Cl.
| | | |
|---|---|---|
| *C01B 6/00* | (2006.01) | |
| *C01B 6/02* | (2006.01) | |
| *C01B 6/04* | (2006.01) | |
| *C01B 6/24* | (2006.01) | |
| *C01B 6/34* | (2006.01) | |

(52) U.S. Cl.
CPC ... *C01B 6/00* (2013.01); *C01B 6/24* (2013.01); *C01B 6/243* (2013.01); *Y02E 60/327* (2013.01); *C01B 6/04* (2013.01)
USPC ............................. 423/644; 423/286; 423/647

(58) Field of Classification Search
CPC ....................................................... C01B 6/34
See application file for complete search history.

(56) References Cited

U.S. PATENT DOCUMENTS

| | | | |
|---|---|---|---|
| 4,659,373 A | 4/1987 | Bogdanovic | |
| 6,752,881 B2 | 6/2004 | Klassen et al. | |
| 6,814,782 B2 | 11/2004 | Bogdanovic et al. | |
| 7,311,991 B2 * | 12/2007 | Huang et al. | 429/421 |
| 2003/0013605 A1 | 1/2003 | Klassen et al. | |
| 2004/0166057 A1* | 8/2004 | Schell et al. | 423/658.2 |
| 2007/0068342 A1 | 3/2007 | Barkhordarian et al. | |

(Continued)

FOREIGN PATENT DOCUMENTS

| | | |
|---|---|---|
| DE | 3340492 A1 | 5/1985 |
| DE | 3535378 A1 | 4/1987 |

(Continued)

OTHER PUBLICATIONS

European Search Report for EP 09178562 mailed Mar. 20, 2010.

(Continued)

*Primary Examiner* — Melvin C Mayes
*Assistant Examiner* — Colin W Slifka
(74) *Attorney, Agent, or Firm* — Marshall, Gerstein & Borun LLP

(57) ABSTRACT

The present invention concerns a method of activating or regenerating a hydrogen storage material which contains at least one metal hydride. The at least one metal hydride is brought into contact with an inert solvent and the inert solvent is subsequently removed again. After contacting with and removal of the inert solvent, there is not only an increase in the reaction rate but surprisingly the hydrogenation also proceeds more completely. The present method is particularly advantageous when the hydrogen storage material contains at least components which interact with one another during absorption and desorption.

15 Claims, 6 Drawing Sheets

Time (hours)

(56) References Cited

U.S. PATENT DOCUMENTS

| | | |
|---|---|---|
| 2007/0258848 A1 | 11/2007 | Barkhordarian et al. |
| 2008/0292541 A1 | 11/2008 | Kamada et al. |
| 2009/0028782 A1* | 1/2009 | Stephens .................... 423/644 |
| 2009/0142258 A1* | 6/2009 | Ritter et al. ................ 423/646 |
| 2009/0291040 A1* | 11/2009 | Tange et al. ................ 423/413 |

FOREIGN PATENT DOCUMENTS

| | | |
|---|---|---|
| DE | 102005019108 A1 | 10/2006 |
| JP | 57-081022 A | 5/1982 |
| JP | 2009-051688 A | 3/2009 |
| WO | WO-0058206 A1 | 10/2000 |
| WO | WO-0153195 A1 | 7/2001 |
| WO | WO-0168515 A1 | 9/2001 |
| WO | WO-2005019097 A1 | 3/2005 |
| WO | WO-2005068073 A1 | 7/2005 |
| WO | WO-2007/055146 A1 | 5/2007 |

OTHER PUBLICATIONS

Bogdanovic et al., "Ti-doped alkali metal aluminum hydrides as potential novel reversible hydrogen storage materials," Journal of Alloys and Compounds, Elsevier Sequoia, Lausanne, Ch, Bd. 253-254, May 20, 1997, pp. 1-9, XP004126498.

Zaluska et al., "Sodium alanates for reversible hydrogen storage," Journal of Alloys and Compounds, Elsevier Sequoia, Lausanne, Ch. Bd. 298, Nr. 1-2, Feb. 1, 2000, pp. 125-135, XP004185245.

Kojima et al., "Hydrogen Generation by Hydrolysis Reaction of Magnesium Hydride," Journal of Materials Science, Springer Netherlands, NL, Bd. 39, Nr. 6, Mar. 15, 2004, pp. 2227-2229, XP001233089.

* cited by examiner

US 8,815,207 B2

METHOD OF ACTIVATING OR REGENERATING A HYDROGEN STORAGE MATERIAL

CROSS-REFERENCE TO RELATED APPLICATION

The present application claims the benefit of priority of German Patent Application No. 10 2008 063 895.1 filed Dec. 19, 2008. The entire text of the priority application is incorporated herein by reference in its entirety.

FIELD OF THE INVENTION

The present invention relates to a method of activating or regenerating a hydrogen storage material which contains at least one metal hydride.

BACKGROUND AND PRIOR ART

Energy storage by means of hydrogen has been gaining increasing importance in recent times. There are now various techniques for storing hydrogen among which a distinction can be made between storage in the gaseous state, the liquid state or in the chemically bound state in the form of metal hydrides. The storage of gaseous or liquid hydrogen often leads to safety problems. Hydrogen storage systems in which hydrogen is stored in the chemically bound state in the form of metal hydrides are therefore advantageous. Such metal hydride hydrogen stores have a storage state and a nonstorage state, between which they can be converted essentially reversibly.

Metal hydride hydrogen stores which are of particular interest are the aluminium hydrides $NaAlH_4$, $LiAlH_4$, $Li_3ALH_6$, $LiNa_2ALH_6$, $Ca(ALH_4)_2$ and borohydrides such as $LiBH_4$, $NaBH_4$, $Mg(BH_4)_2$, $Ca(BH_4)_2$ and also magnesium hydride ($MgH_2$) due to their relatively high hydrogen storage capacity per unit mass. Although this property and the relatively low price of materials make the abovementioned systems appear to be optimal hydrogen storage systems for transport in the case of hydrogen-driven motor vehicles, their unsatisfactory charging and discharging kinetics have hitherto prevented their use.

Mixing a catalyst into the hydrogen storage material to improve the kinetics in the absorption and desorption of hydrogen is known. WO 2005/019097 A1 discloses the use of a metal carbonate as catalyst for improving the kinetics in the absorption and desorption of hydrogen. WO 2005/068073 A1 discloses the use of a metal-organic compound as catalyst for improving the kinetics in the absorption and desorption of hydrogen. WO 01/53195 A1 discloses the use of metal nitrides and carbides as catalyst for improving the kinetics in the absorption and desorption of hydrogen. WO 00/58206 A1 discloses the use of metal oxides as catalyst for improving the kinetics in the absorption and desorption of hydrogen. DE 10 2005 019 108 B4 discloses a process for producing a hydrogen storage material containing metal hydride, in which metal hydride powder is milled in the presence of from 0.01 to 10% by weight of diamond powder under an inert gas atmosphere, a hydrogen atmosphere or reduced pressure. DE 35 35 378 A1 discloses the use of pulverulent transition metals or transition metal oxides, e.g. palladium, $Pd(Al_2O_3)$ or palladium-coated powder, for improving the contamination resistance of hydrogen storage material. DE 33 40 492 A1 relates to a process for preparing finely divided, highly reactive magnesium from magnesium hydride, magnesium anthracene and/or derivatives thereof, in which the respective magnesium-containing compound is thermally decomposed in the presence of a reaction partner. WO 01/68515 A1 discloses the use of transition metal compounds in catalytic amounts for improving the hydrogenation/dehydrogenation kinetics of alkali metal alanates. The processes mentioned have the disadvantage of relatively high additional materials costs. In addition, catalysts can no longer be introduced, or can be introduced only with great difficulty, into the hydrogen storage material when this has already been introduced into a tank. The processes mentioned are consequently not suitable at all for regenerating hydrogen storage material.

It is thus an object of the present invention to provide a method of activating or regenerating a hydrogen storage material which contains at least one metal hydride, which process can be carried out inexpensively even when the hydrogen storage material has already been introduced into a tank of the same and does not have the disadvantages of the prior art.

According to the invention, the object is achieved by a method of activating or regenerating a hydrogen storage material which contains at least one metal hydride, in which the at least one metal hydride is brought into contact with an inert solvent and the inert solvent is subsequently removed again. In the context of the invention, an "inert solvent" is one which does not react chemically with the hydrogen storage material under the contact conditions, in particular does not oxidize or reduce said material. The inert solvent is preferably added to the hydrogen storage material in a tank of the same.

The hydrogen storage material preferably contains a complex borohydride, a complex aluminium hydride and/or a metal hydride such as magnesium hydride, even more preferably at least one metal hydride selected from the group consisting of $NaAlH_4$, $LiAlH_4$, $Li_3AlH_6$, $LiNa_2AlH_6$, $Ca(AlH_4)_2$, $MgH_2$ and combinations thereof, most preferably at least one metal hydride selected from the group consisting of $LiBH_4$, $NaBH_4$, $Ca(BH_4)_2$, $LiAlH_4$, $NaAlH_4$, $Ca(AlH_4)_2$ in combination with $MgH_2$.

The inert solvent is preferably selected from the group consisting of water, an alcohol, more preferably ethanol or tetrahydrofuran, an ether, more preferably diethyl ether, a ketone, more preferably acetone, ammonia, an amine, an amide and combinations thereof. Water and/or ethanol are most preferred.

The period of time between contacting of the hydrogen storage material with the inert solvent and removal of the inert solvent is preferably from 5 seconds to 60 minutes, more preferably from 10 seconds to 60 minutes, most preferably from 10 seconds to 10 minutes.

The solvent is subsequently removed again. This is preferably effected by applying a vacuum or heating the hydrogen storage material which has been contacted with the inert solvent.

DETAILED DESCRIPTION

Figure 1:
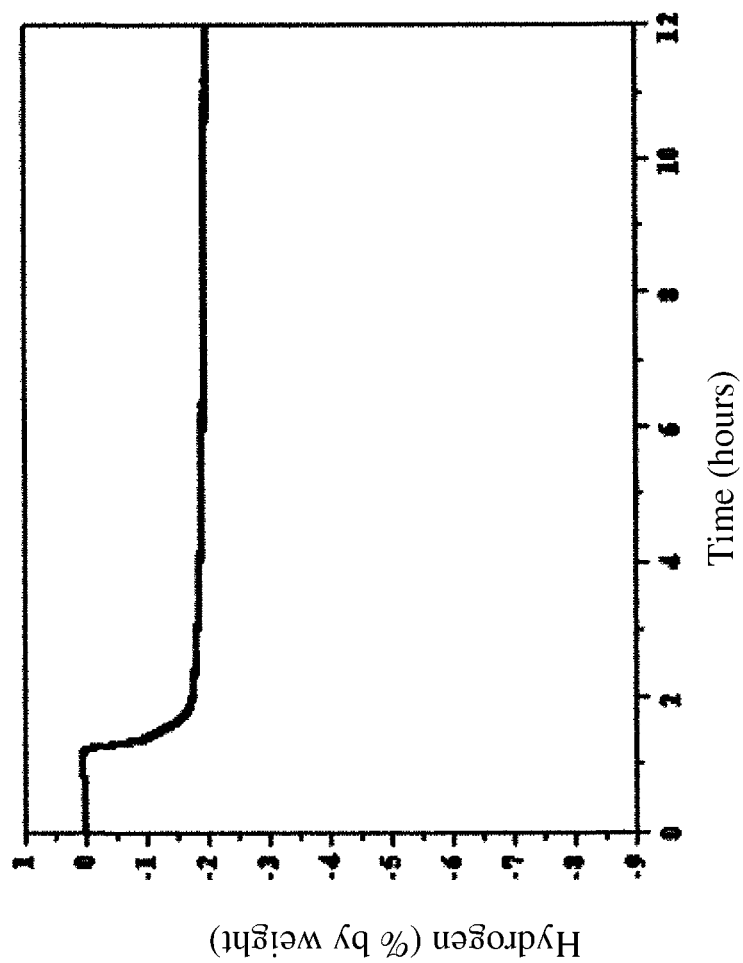
FIG. 1 shows the dehydrogenation of a system 2 $NaBH_4$+ $MgH_2$ which has been milled for 5 hours before carrying out the experiment, at 450° C. under reduced pressure.
Figure 2:
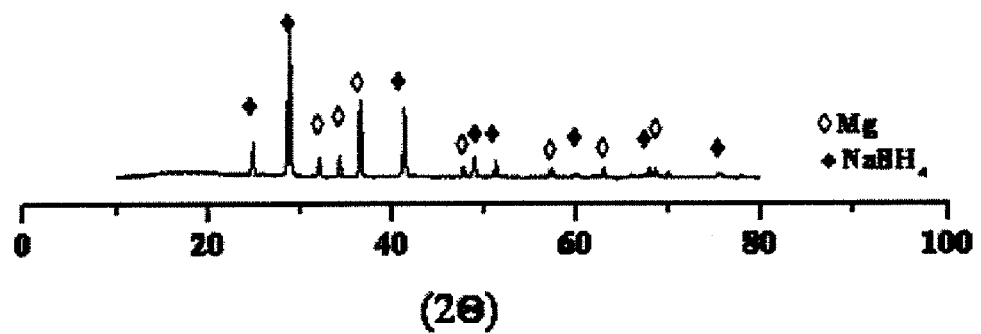
FIG. 2 shows the X-ray diffraction pattern of the system 2 $NaBH_4$+$MgH_2$ from FIG. 1 (without contacting with water)
Figure 3:
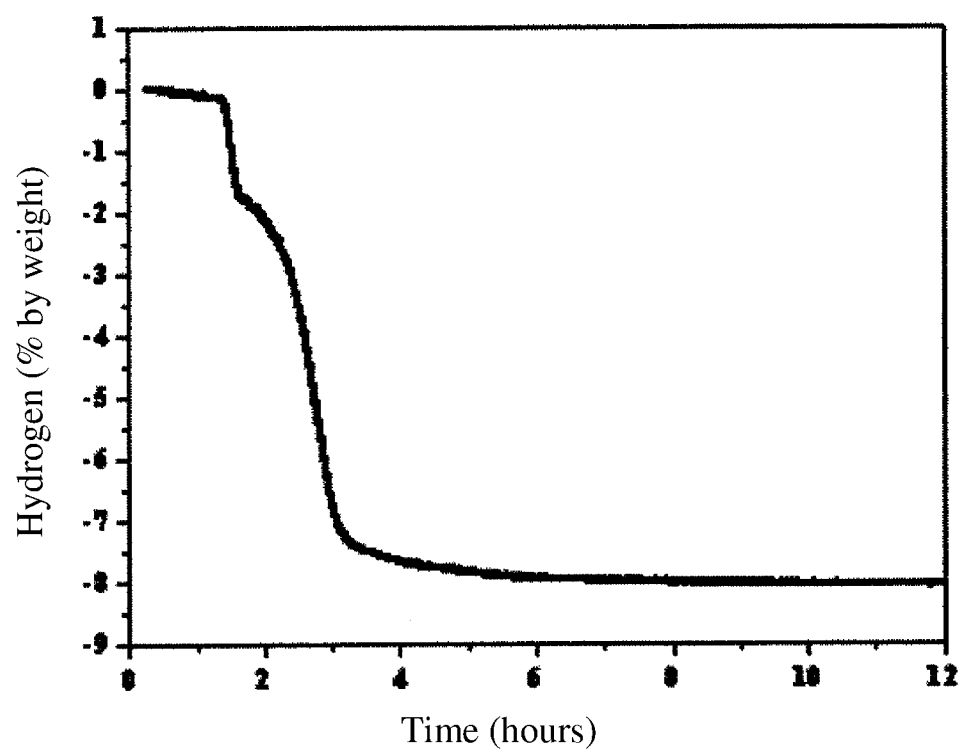
FIG. 3 shows the dehydrogenation of a system 2 $NaBH_4$+ $MgH_2$ which has been milled for 5 hours before carrying out the experiment, at 450° C. under reduced pressure after injection and removal of water.
Figure 4:
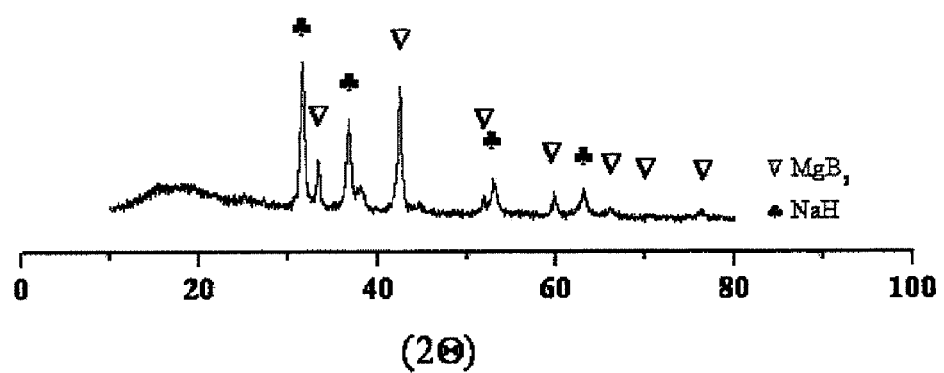
FIG. 4 shows the X-ray diffraction pattern of the system 2 $NaBH_4+MgH_2$ from FIG. 3 (after contacting with and removal of water)
Figure 5:
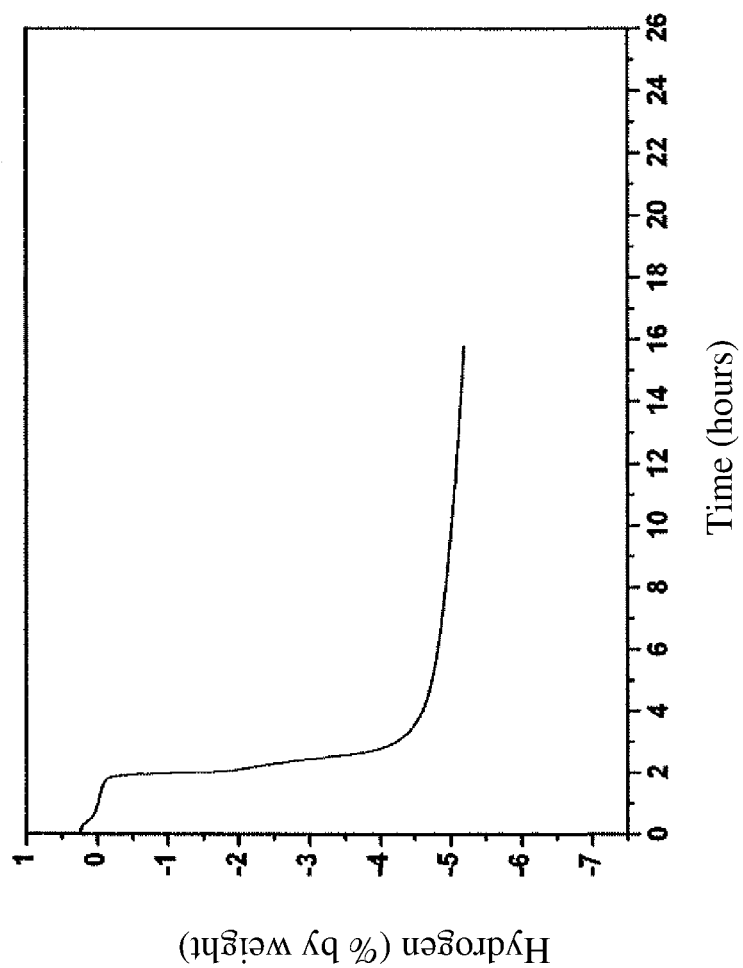
FIG. 5 shows the dehydrogenation of a system 2 $NaBH_4+MgH_2$ which has been milled for 5 hours before carrying out the experiment, at 450° C. under reduced pressure after injection and removal of ethanol, with the contact time being 10 seconds.
Figure 6:
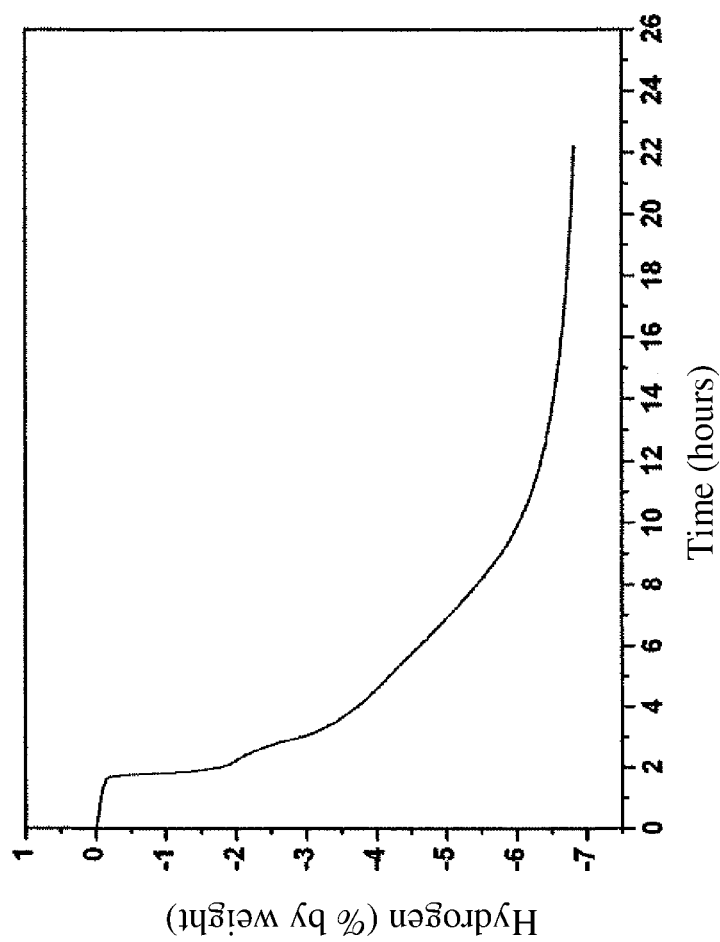
FIG. 6 shows the dehydrogenation of a system 2 $NaBH_4+MgH_2$ which has been milled for 5 hours before carrying out the experiment, at 450° C. under reduced pressure after injection and removal of ethanol, with the contact time being 10 minutes.

The figures show that after contacting with and removal of the inert solvent, there is not only an increase in the reaction rate but surprisingly the hydrogenation also proceeds more completely.

The present method is particularly advantageous when the hydrogen storage material contains at least two metal hydrides which interact with one another during absorption and desorption. At least one of the components, preferably a complex borohydride and/or a complex aluminium hydride, has to be soluble in the inert solvent, preferably at ambient temperature (from about 20 to 25° C.). As inert solvents for complex borohydrides such as $NaBH_4$, particular preference is given to coordinating solvents such as water, alcohols, e.g. ethanol, ammonia, amines such as methylamine or ethylamine or ethers such as diethyl ether or tetrahydrofuran. As inert solvents for aluminium hydrides, particular preference is given to ethers such as diethyl ether, tetrahydrofuran, monoglyme, diglyme, triglyme, tetraglyme, dioxane or dibutyl ether.

The invention claimed is:

1. Method of activating or regenerating a hydrogen storage material which contains at least one metal hydride, wherein the at least one metal hydride is brought into contact with an inert solvent selected from the group consisting of water, ammonia, an amine, an amide and combinations thereof, and the inert solvent is subsequently removed again; wherein the period of time between contacting of the hydrogen storage material with the inert solvent and removal of the inert solvent is from 5 seconds to 10 minutes.

2. Method according to claim 1, wherein the hydrogen storage material contains a complex borohydride, a complex aluminium hydride and/or a magnesium hydride.

3. Method according to claim 2, wherein the inert solvent is water.

4. Method according to claim 2, wherein the inert solvent is removed by applying a vacuum or heating.

5. The method of claim 2, wherein the time between contacting of the hydrogen storage material with the inert solvent and removal of the inert solvent is from 10 seconds to 5 minutes.

6. Method according to claim 1, wherein the hydrogen storage material contains at least one metal hydride selected from the group consisting of $NaAlH_4$, $LiAlH_4$, $Li_3AlH_6$, $LiNa_2AlH_6$, $Ca(AlH_4)_2$, $MgH_2$ and combinations thereof.

7. Method according to claim 6, wherein the inert solvent is water.

8. Method according to claim 6, wherein the inert solvent is removed by applying a vacuum or heating.

9. Method according to claim 1, wherein the hydrogen storage material contains at least one metal hydride selected from the group consisting of $LiBH_4$, $NaBH_4$, $Ca(BH_4)_2$, $LiAlH_4$, $NaAlH_4$, $Ca(AlH_4)_2$ in combination with $MgH_2$.

10. Method according to claim 9, wherein the inert solvent is selected from the group consisting of water, an alcohol, an ether, a ketone, ammonia, an amine, an amide and combinations thereof.

11. Method according to claim 9, wherein the inert solvent is removed by applying a vacuum or heating.

12. Method according to claim 1, wherein the inert solvent is water.

13. Method according to claim 12, wherein the inert solvent is removed by applying a vacuum or heating.

14. Method according to claim 1, wherein the inert solvent is removed by applying a vacuum or heating.

15. The method of claim 1, wherein the time between contacting of the hydrogen storage material with the inert solvent and removal of the inert solvent is from 10 seconds to 5 minutes.

* * * * *